United States Patent
Kamada et al.

(10) Patent No.: US 8,034,156 B2
(45) Date of Patent: *Oct. 11, 2011

(54) METHOD FOR PRODUCING DECOMPOSER OF ORGANIC HALOGENATED COMPOUNDS

(75) Inventors: Masami Kamada, Funabashi (JP); Taishi Uehara, Oodate (JP)

(73) Assignee: Dowa Eco-System Co., Ltd., Tokyo (JP)

( * ) Notice: Subject to any disclaimer, the term of this patent is extended or adjusted under 35 U.S.C. 154(b) by 1019 days.

This patent is subject to a terminal disclaimer.

(21) Appl. No.: 11/886,843

(22) PCT Filed: Mar. 22, 2006

(86) PCT No.: PCT/JP2006/306383
§ 371 (c)(1),
(2), (4) Date: Sep. 21, 2007

(87) PCT Pub. No.: WO2006/101247
PCT Pub. Date: Sep. 28, 2006

(65) Prior Publication Data
US 2009/0054718 A1  Feb. 26, 2009

(30) Foreign Application Priority Data

Mar. 25, 2005 (JP) ................................. 2005-087603
Jun. 2, 2005  (JP) ................................. 2005-162638

(51) Int. Cl.
*B22F 1/00* (2006.01)
(52) U.S. Cl. ............... 75/352; 75/354; 75/356; 75/252; 210/908; 210/909; 502/331; 588/316; 588/406
(58) Field of Classification Search .............. 419/61; 75/352
See application file for complete search history.

(56) References Cited

U.S. PATENT DOCUMENTS

| | | | | | |
|---|---|---|---|---|---|
| 3,591,362 | A | * | 7/1971 | Benjamin | 428/570 |
| 3,821,151 | A | * | 6/1974 | Mitchell | 524/406 |
| 3,943,048 | A | * | 3/1976 | Fisher et al. | 204/293 |
| 6,217,779 | B1 | * | 4/2001 | Orth et al. | 210/757 |
| 2005/0166709 | A1 | * | 8/2005 | Yahagi et al. | 75/246 |

FOREIGN PATENT DOCUMENTS

| | | |
|---|---|---|
| JP | 11-235577 | 8/1999 |
| JP | 2000-5740 | 1/2000 |
| JP | 2002-69425 | 3/2002 |
| JP | 2002-316050 | 10/2002 |
| JP | 2003-339902 | 12/2003 |
| JP | 2004-249223 | 9/2004 |
| JP | 2004-331996 | 11/2004 |

OTHER PUBLICATIONS

Carl C. Koch, "Milling of Brittle and Ductile Materials," ASM Handbook vol. 7, 1998, pp. 53-66.*
Machine translation of JP 2004-249223 A (Japanese document dated Sep. 9, 2004).*

* cited by examiner

Primary Examiner — Roy King
Assistant Examiner — Christopher Kessler
(74) Attorney, Agent, or Firm — Clark & Brody

(57) ABSTRACT

A method for producing a decomposer of an organic halogenated compound comprises subjecting an iron powder produced beforehand to plastic deformation that gives the iron powder particles a flat shape. Further, an iron powder and a copper salt powder are mechanically mixed in a ball mill to produce a copper salt-containing iron particle powder in which the particles of the two powders are joined. In this case, the method for producing the decomposer of an organic halogenated compound is characterized in that the iron powder is mechanically deformed to give the particles a flat shape.

2 Claims, No Drawings

METHOD FOR PRODUCING DECOMPOSER OF ORGANIC HALOGENATED COMPOUNDS

TECHNICAL FIELD

This invention relates to a method for producing a decomposer for decomposing organic halogenated compounds contained in soil, underground water and the like.

BACKGROUND ART

Recent years have seen advances in the development of technologies for purifying soil, groundwater and the like contaminated with organic halogenated compounds, by decomposing the compounds so as to reduce the contamination level. This development is directed basically to obtaining decomposers with high capability to decompose the organic halogenated compounds constituting the contaminants. Iron powder is a typical decomposer. For example, Patent Document 1 teaches that soil contaminated with an organic halogenated compound like trichloroethylene can be effectively treated to decompose the trichloroethylene or the like in the soil by mixing therein iron powder containing 0.1 wt % or more of C (carbon) and having a specific surface area of 500 $cm^2/g$ or greater.

Patent Document 2 teaches that high-purity iron powder containing C: less than 0.1 mass %, Si: less than 0.25 mass %, Mn: less than 0.60 mass %, P: less than 0.03 mass %, S: less than 0.03 mass % and O: less than 0.5 mass % is effective for purifying soil or water contaminated with a recalcitrant organic halogenated compound like 1,2-cis-dichloroethylene (cis-1,2-DCE).

However, a need was felt for a decomposer with even stronger decomposition capability. To meet this need, Patent Document 3, Patent Document 4 and Patent Document 5, which are in the name of the same applicant as the applicant of this application, propose copper-containing iron powders obtained by depositing metallic copper on the surfaces of iron powder particles. When such a copper-containing iron powder is added to and mixed with soil, groundwater or the like contaminated with an organic halogenated compound, the organic halogenated compound is efficiently decomposed. Nevertheless, a decomposer with even higher decomposition is desired.

Patent Document 1: JP 11-235577A
Patent Document 2: JP 2002-316050A
Patent Document 3: JP 2000-005740A
Patent Document 4: JP 2002-069425A
Patent Document 5: JP 2003-339902A

PROBLEM TO BE OVERCOME BY THE INVENTION

The problem to be solved by the present invention is to efficiently obtain at low cost a decomposer that exhibits still higher decomposition capability than heretofore even with respect to recalcitrant cis-1,2-DCE and other organic halogenated compounds.

MEANS FOR SOLVING THE PROBLEM

The inventors discovered that the capacity of an iron powder to decompose organic halogenated compounds is enhanced by mechanically modifying the particle shape of an iron powder produced beforehand so as to modify its surface condition and also reform the structure of the powder interior. More specifically, it was found that when iron powder particles are crushed and spread out by plastic deformation, the inner iron matrix of the particles comes to be exposed at the surface and the particles are deformed into a flattened shape by the spreading, and that this works to increase the decomposition performance of the iron powder with respect to organic halogenated compounds. The present invention therefore provides a method for producing a decomposer of organic halogenated compounds that comprises subjecting iron powder particles produced beforehand to plastic deformation that gives the iron powder particles a flat shape. The plastic deformation of the iron powder particles can be conducted using a ball mill, particularly a vibrating ball mill. The flat particles preferably have a planar ratio of 2 or greater.

It was further found that an organic halogenated compound decomposer well suited for decomposition of recalcitrant cis-1,2-DCE and the like can be obtained by mechanically mixing an iron powder and a copper salt powder to obtain a copper salt-containing iron particle powder having copper salt physically joined to the iron powder particles. It was found that in this case an organic halogenated compound decomposer even better suited for decomposition of recalcitrant cis-1,2-DCE and the like can be obtained by loading the iron powder and the copper salt powder into a ball mill and conducting plastic deformation that that gives the iron powder particles a flat shape and physically joins the copper salt powder to the surface of the iron powder particles. The present invention therefore provides a method for producing a decomposer of organic halogenated compounds characterized in that, at the time of producing a copper salt-containing iron particle powder by mechanically mixing an iron powder and a copper salt powder in a mill (particularly in a vibrating ball mill) to join the particles of the two powders, the mechanical mixing plastically deforms the powders to give the particles a flat shape. The flat particles preferably have a planar ratio of 2 or greater.

The mechanical mixing is best conducted by the dry method and the iron powder is preferably reduced iron powder. Further, in order to avoid dissolution by the water of crystallization of the copper salt powder during mixing with the iron powder, the copper salt powder used is desirably one that has been dehydrated beforehand to remove part or all of the water of crystallization.

In accordance with the present invention, it is possible to obtain a decomposer having high decomposition capability with respect to even recalcitrant organic halogenated compounds such as cis-1,2-DCE, efficiently and at low cost, and to make a major contribution to the purification of, for example, soil, groundwater and other kinds of water contaminated with such organic halogenated compounds.

PREFERRED EMBODIMENTS OF THE INVENTION

In the present invention, the organic halogenated compounds to be decomposed include so-called VOCs, and, for example include dichloromethane, carbon tetrachloride, 1,2-dichloroethane, 1,1-DCE, cis-1,2-DCE, 1,1,1-trichloroethane, 1,1,2-trichloroethane, TCE, tetrachloroethylene, 1,3-dichloropropene, trans-1,2-dichloroethylene, trihalomethane, PCB, dioxin and, the like. These organic halogenated compounds may be present individually or in combinations. The decomposer of the present invention exhibits a catalytic effect in the dehalogenation reaction of an organic halogenated compound. Although fluorine and chlorine are the typical halogen elements, the decomposer of the present invention is particularly suitable for decomposition of organic chlorinated compounds.

The decomposer of the present invention is for treating water, soil, inorganic substances, composites thereof and the like contaminated with organic halogenated compounds such as the foregoing and is capable of decomposing these organic halogenated compounds. It is useful particularly in environmental applications for purification of wastewater, groundwater, soil, exhaust gases and the like contaminated with the aforesaid organic halogenated compounds.

When the decomposer of the present invention is used for purification of wastewater, groundwater, soil, exhaust gases and the like contaminated with the aforesaid organic halogenated compounds, implementation is possible, for example, using an earth auger or other large civil engineering machinery and equipment conventionally employed in purification operations, while flexible containers, paper bags and other commercially available packing containers are sufficient for storage of the decomposer. The decomposer according to the present invention is therefore excellent in both handling and storage property.

In the production of the decomposer according to the present invention, the starting iron powder used can, for example, be atomized iron powder manufactured by atomizing molten iron or reduced iron powder produced by reducing iron ore. The particle diameter of the starting iron powder is not particularly limited. Although the starting iron powder need only have iron as its main constituent, it should preferably not contain chromium, lead or other constituents that may be a source of secondary contamination. A copper salt powder is preferable as the copper source starting material joined to the iron powder, and copper sulfate, for example, can be used as the copper salt powder. It is possible to use copper oxide or metallic copper instead of copper salt.

Production of the decomposer of the present invention requires primarily the particles of the starting iron powder to be flattened by imparting plastic deformation thereto, and concretely is essentially a process of crushing and flattening the iron powder particles. For example, the iron powder starting material is loaded in a mill and the particles are flattened. The mill used is preferably a vibrating ball mill of the type that vibrates a case into which many hard balls measuring several mm in diameter are charged. When the case is vibrated, the balls inside vibrate and collide, so that when starting iron powder is present in the case, the particles of the iron powder are crushed and spread out. Iron powder formed into the desired flattened shape can be obtained by regulating the vibration period and amplitude, number of balls charged, amount of starting material charged, and the atmosphere. When a suitable amount copper salt powder is made co-present at this time, a flat iron powder containing copper salt can be obtained. Slippage between the balls and the powders should preferably be suppressed so that the ball mill can effectively conduct plastic deformation, and therefore, it is advisable in this invention to avoid use of dispersants and lubricants generally utilized in ball mills to facilitate mixing and pulverization.

Copper sulfate powder is preferable as the copper salt powder. Although copper sulfate is ordinarily procured in the form of $CuSO_4 \cdot 5H_2O$ including water of crystallization, the water of crystallization should desirably be removed as much as possible when used in the invention method for producing a decomposer. Moisture from water of crystallization, moisture adhering to the mill surface, moisture in the atmosphere and moisture from elsewhere may produce an aqueous solution of copper sulfate during mixing of the iron powder and copper sulfate, in which case Cu ions in the aqueous solution may deposit on the iron particle surfaces as reduced metallic copper so that the iron particle surfaces are liable to become coated with a film of the deposited metallic copper. If the iron powder particle surfaces should be completely covered with metallic copper, the performance of the decomposer may be degraded. The water of crystallization of the copper sulfate is therefore preferably removed to the utmost possible, the mixing with the iron powder is preferably conducted by a dry method that minimizes moisture entrainment, and the mixing is preferably carried out in an inert gas atmosphere. $CuSO_4 \cdot 5H_2O$ can be removed of water of crystallization by heating. For example, 2 water molecules can be removed by 45° C. heating, 4 by 110° C. heating, and all 5 by 250° C. heating.

The decomposer according to the present invention comprises iron particles of a flat shape having a planar ratio of 2 or greater. If the planar ratio is less than 2, the decomposition reaction velocity constant κobs (abbreviated to κ) discussed later does not reach 0.2 and the organic halogenated compound decomposition capability is low. On the other hand, the value of κ saturates when the planar ratio exceeds 15. The planar ratio is therefore preferably in the range of 2 to 15. The planar ratio is the ratio of flat surface diameter to thickness of the individual particles measured with an electron microscope (SEM). The measurement is done by randomly selecting 50 particles from within the SEM image and averaging their planar ratios. When the measurement is based on an SEM image photograph, it is advisable to enlarge the photograph to make the largest diameter of one of the particle around 10 mm. More specifically, it is possible to make the SEM observation at a magnification of 100-150× and directly measure the image using the scale of a digital caliper or the like.

In this case, the average diameter of the flat particles is calculated as follows. Fifty powder particles within the field of view are measured in the direction of the flat surface for their major axis length and minor axis length perpendicular thereto, the flat surface diameters are calculated as (major axis length+minor axis length)/2, and the average flat surface diameter of the 50 particles is calculated. Further, the thickness of the particles is measured and the average thickness of the 50 particles calculated. The average flat particle diameter is then calculated by the following equation Average flat particle diameter=(Average flat surface diameter×2+Average thickness)/3.

The planar ratio is calculated by the following equation

Planar ratio=Average flat surface diameter/Average thickness.

The average diameter of the flat particles according to the present invention is 1-500 μm, preferably 25-250 μm. Typically, the average flat surface diameter is in the range of 50-500 μm, the average thickness is in the range of 1-50 μm, and the planar ratio is desirably 2-15. Owing to this flat shape, excellent decomposition capability can be manifested, but excessive flatness degrades the fluidity of the powder, making it inconvenient to handle, and, moreover, no further improvement in decomposition performance can be expected, so that the flat shape and particle diameter set out above is desirable.

The particles of the decomposer in accordance with the present invention are larger in surface area than those of the starting iron powder prior to plastic deformation, and owing to the increase in surface area by the plastic deformation, new surface areas are formed where the internal structure of the particles is exposed at the surface, whereby the decomposition performance of the iron powder with respect to organic halogenated compounds is enhanced. The reason for this is not clear but it is thought that there is collective involvement of different factors, such as that the number of reaction sites is increased by the formation of new surface areas at the particle surface, that the specific surface area of the iron powder increases, and that the surface condition of the particles is modified so as to improve the adherability of volatile organic compounds (VOCs) and further improve water wettability, thereby improving contactability with contaminants. Moreover, the presence of copper, sulfur and acid radicals at or near the iron powder surface further increases decomposition performance.

In the Examples set out below, the decomposition capability of the organic halogenated compound decomposer is rated by using the test method in accordance with the following procedures a) to f) to calculate the decomposition reaction velocity constant κobs (denoted simply as κ) with respect to cis-1,2-DCE.

a) Place 10 g kaolin and 0.1 g decomposer in a 20 ml vial and mix uniformly.

b) Add 6 g ion exchanged water to the foregoing mixed powder, allow it to thoroughly acclimatize, and enable hermetic sealing by using an aluminum cap to tighten a butyl rubber stopper having a fluororesin liner.

c) Using a microsyringe, further inject 1 μL each of cis-1, 2-DCE and benzene, then hermetically seal.

d) Allow to stand in a 25° C. thermostatic bath for 1 hour, sample 0.1 mL of the headspace gas, measure the gas concentration of the cis-1,2-DCE injected in c) with a gas chromatograph, and define this concentration as the initial value $C_0$.

e) At regular intervals over a 4-day period following d), analyze the headspace gas and measure the cis-1,2-DCE gas concentration C with the gas chromatograph to evaluate the cis-1,2-DCE concentration attenuation.

f) Express the cis-1,2-DCE decomposition reaction velocity constant κ (unit: $day^{-1}$) using the following equation (where t represents days elapsed from the time of the initial value)

$$\ln(C/C_0) = -k \times t.$$

WORKING EXAMPLES

Example 1

As the starting powder was used a reduced iron powder comprising S: 0.012%, C: 0.26%, O: 1.61% and the balance substantially of iron, which powder had an average particle diameter of 100 μm, an apparent density of 2.7 $g/cm^3$, and a BET specific surface area of 0.17 $m^2/g$. This reduced iron powder, 100 g, was charged into a vibrating ball mill together with an amount of copper sulfate ($CuSO_4 \cdot 5H_2O$) powder such that the amount of copper was 1 mass % relative to the amount of iron of the reduced iron powder (i.e., at the ratio of Cu/Fe=0.01). The vibrating ball mill was further charged with 5 mm diameter zirconia balls whose volume was equal to 50 vol % of the internal volume of the mill. Next, the internal atmosphere of the mill was replaced with nitrogen gas and the mill was operated for 4 hours at a vibration frequency of 1250 vpm and amplitude of 9 mm to mechanically mix the reduced iron powder and copper sulfate. After the mixing was stopped, the powder inside was removed into the atmosphere.

Measurement of the powder obtained with a laser diffraction particle size analyzer showed it to have an accumulative particle size distribution in mass: D10 of 14.6 μm, D50 of 58.8 μm, and D90 of 121.8 μm. The planar ratio was 8.8, the BET specific surface area was 1.03 $m^2/g$, and the powder copper content was 0.83 mass %. The powder was subjected to the aforesaid organic halogenated compound decomposition capability evaluation test. The cis-1,2-DCE concentration on day four was 99% down from the initial value, with only 1% remaining, and the decomposition reaction velocity constant κ was 1.2 day-1.

Examples 2-8

Example 1 was repeated except that the kind of copper sulfate used as the copper salt powder (each kind of copper sulfate differing in water of crystallization content), iron powder and copper sulfate mixing ratio (Cu/Fe mass ratio), kind of substitutional gas in the mill, and mill operating conditions (vibration frequency, amplitude, time) were modified to the conditions of the respective Examples (Examples 2-8) shown in Table 1. The powders obtained in the Examples were evaluated by the method used in Example 1 and the results are also included in Table 1.

TABLE 1

| | Production conditions | | | | | Operating conditions | | | Product | | |
|---|---|---|---|---|---|---|---|---|---|---|---|
| | Fe starting powder | Cu starting powder | Cu/Fe | Cu addition method | Atmosphere | Vibration frequency VPM | Amplitude mm | Time Hr | BET $m^2/g$ | Decomposition performance κ | Planar ratio |
| Example 1 | Reduced | $CuSO_4 \cdot 5H_2O$ | 0.01 | Dry | $N_2$ | 1250 | 9 | 4 | 1.03 | 1.2 | 8.8 |
| Example 2 | Reduced | $CuSO_4 \cdot 5H_2O$ | 0.01 | Dry | $N_2$ | 1250 | 9 | 2 | 0.33 | 0.75 | 4.2 |
| Example 3 | Reduced | $CuSO_4 \cdot 5H_2O$ | 0.01 | Dry | $N_2$ | 1250 | 9 | 1 | 0.36 | 0.45 | 3.2 |
| Example 4 | Reduced | $CuSO_4 \cdot H_2O$ | 0.01 | Dry | $N_2$ | 1250 | 9 | 1 | 0.35 | 0.44 | 3.2 |
| Example 5 | Reduced | $CuSO_4 \cdot H_2O$ | 0.01 | Dry | Air | 1250 | 9 | 1 | 0.33 | 0.54 | 3.8 |
| Example 6 | Reduced | $CuSO_4 \cdot 5H_2O$ | 0.01 | Dry | Air | 1250 | 9 | 1 | 0.33 | 0.39 | 2.8 |
| Example 7 | Reduced | $CuSO_4 \cdot H_2O$ | 0.02 | Dry | Air | 1250 | 9 | 1 | 0.52 | 3.09 | 6.1 |
| Example 8 | Reduced | $CuSO_4 \cdot H_2O$ | 0.03 | Dry | Air | 1250 | 9 | 1 | 0.71 | 3.54 | 3.8 |
| Example 9 | Reduced | | 0 | | $N_2$ | 1250 | 9 | 4 | 0.31 | 0.01 | 2.4 |
| Comparative Example 1 | Reduced | | 0 | | | | | | 0.03 | <0.01 | 1.4 |
| Comparative Example 2 | Spongy | | 0 | | | | | | 3.1 | <<0.01 | 1.5 |
| Comparative Example 3 | Reduced | $CuSO_4 \cdot H_2O$ | 0.01 | Dry | $N_2$ | | | | 0.03 | 0.08 | 1.4 |

The following can be seen from the results in Table 1.

In Examples 1-3, production was carried out under the same conditions except that the run time was varied. It can be seen that the planar ratio and κ value both increased with increasing run time.

In Examples 5, 7 and 8, production was carried out under the same conditions except that the Cu/Fe mixing ratio was varied. It can be seen that the κ value increased with higher Cu/Fe mixing ratio, namely, as the ratio rose from 0.01 to 0.02 to 0.03.

In Examples 3 and 5, production was carried out under substantially the same conditions except that copper sulfates having different amounts of water of crystallization were used. The κ value was higher in Example 5 using copper sulfate monohydrate than in Example 3 using copper sulfate pentahydrate, indicating that use of a copper salt powder low in water of crystallization improved decomposition capability.

In Examples 4 and 5, and in Examples 3 and 6, production was carried out under the same conditions except that the atmospheric gas inside the mill differed between nitrogen gas and air. Improved κ value was noted when the nitrogen gas atmosphere was used.

In the decomposition capability tests conducted on the powders obtained in Examples 1-8, the same tests were repeated using 50 ml unaerated pure water instead of kaolin. At the first measurement conducted after passage of 1 hour, all cis-1,2-DCE gas densities C had fallen below the analytical limit. From this result it was found that the decomposition velocity of these decomposers is outstandingly high.

Example 9

Example 1 was repeated except that no copper sulfate was added. The powder obtained was evaluated by the method used in Example 1 and the results are also included in Table 1.

Comparative Examples 1 and 2

For comparison, the BET value and κ value of the starting iron powder per se used in Example 1 are included in Table 1 as Comparative Example 1 and the BET value and κ value of a commercially available spongy iron powder per se are included therein as Comparative Example 2.

From the results in Table 1, it can be seen that the iron powder obtained in Example 9 had a larger planar ratio and a higher BET value than the starting iron powder of Comparative Example 1 and the spongy iron powder of Comparative Example 2, and was also improved in κ value.

Comparative Example 3

A powder was obtained simply by adding copper sulfate powder to reduced iron powder, without processing the powders in a vibrating ball mill. The κ value of the powder was a low 0.08 day$^{-1}$.

Example 11

Example 1 was repeated at various Cu/Fe mixing ratios and vibrating ball mill run times. Powders with the particle size distributions and BET values shown in Table 2 were obtained. The κ values of the powders were measured and the results are shown in Table 2. The half-value widths in Table 2 are those of statistically processed particle size distribution curves. A smaller half-value width means the spread of the particle distribution was narrower.

From the results in Table 2, it can be seen that by selecting the Cu/Fe mixing ratio and the degree of particle plastic deformation of the powder obtained by the invention method, it is possible to obtain an organic halogenated compound decomposer having a high decomposition capability κ value.

| Composition Cu | D10 μm | D50 μm | D90 μm | Half-value width | BET m$^2$/g | BET/Particle diameter | κ | Remark |
|---|---|---|---|---|---|---|---|---|
| 0.83 | 14.6 | 58.8 | 121.8 | 97.9 | 1.03 | 1.8E−02 | 1.20 | Example 1 |
| 0.90 | 31.6 | 75.5 | 135.2 | 92.6 | 0.33 | 4.4E−03 | 0.75 | Example 2 |
| 0.90 | 23.5 | 71.1 | 137.3 | 97.3 | 0.40 | 5.6E−03 | 0.48 | |
| 0.83 | 25.3 | 77.4 | 150.2 | 107.6 | 0.36 | 4.7E−03 | 0.45 | Example 3 |
| 0.61 | 22.6 | 73.4 | 148.8 | 114.7 | 0.35 | 4.8E−03 | 0.44 | Example 4 |
| 0.68 | 25.3 | 77.5 | 160.4 | 114.0 | 0.34 | 4.4E−03 | 0.34 | |
| 0.81 | 24.6 | 76.5 | 154.7 | 112.9 | 0.37 | 4.8E−03 | 0.31 | |
| 0.84 | 24.8 | 76.2 | 152.9 | 108.0 | 0.35 | 4.6E−03 | 0.41 | |
| 1.00 | 19.7 | 60.8 | 117.2 | 87.6 | 0.41 | 6.8E−03 | 0.55 | |
| 0.89 | 23.1 | 65.0 | 120.9 | 86.5 | 0.38 | 5.8E−03 | 0.49 | |
| 0.73 | 18.2 | 63.5 | 130.3 | 102.3 | 0.38 | 6.0E−03 | 0.46 | |
| 0.60 | 21.2 | 67.2 | 135.6 | | 0.34 | 5.0E−03 | 0.32 | |
| 0.67 | 25.7 | 72.5 | 143.4 | 108.3 | 0.32 | 4.4E−03 | 0.36 | |
| 0.95 | 21.3 | 71.5 | 151.8 | 119.6 | 0.33 | 4.7E−03 | 0.39 | Example 6 |
| 1.32 | 18.5 | 66.6 | 147.4 | 112.2 | 0.41 | 6.2E−03 | 0.45 | |
| 1.45 | 16.5 | 63.5 | 141.5 | 111.0 | 0.47 | 7.3E−03 | 0.46 | |
| 1.62 | 8.1 | 44.6 | 115.8 | 120.7 | 0.66 | 1.5E−02 | 0.47 | |

Example 12

This reduced iron powder, 100 g, was charged into a vibrating ball mill together with an amount of copper sulfate (CuSO$_4$·5H$_2$O) powder such that the amount of copper was 1 mass % relative to the amount of iron of the reduced iron powder (i.e., at the ratio of Cu/Fe=0.01).

As the starting powder was used a reduced iron powder comprising S: 0.012%, C: 0.26%, O: 1.61% and the balance substantially of iron, which powder had an average particle diameter of 100 μm, an apparent density of 2.7 g/cm$^3$, and a BET specific surface area of 0.17 m$^2$/g. Using a vibrating ball mill, this reduced iron powder together with copper sulfate (CuSO$_4$·5H$_2$O) was subjected to processing for flattening the iron powder and processing for joining the iron powder and copper sulfate, using at an amount of the copper sulfate powder such that the amount of copper was 1 mass % relative to the amount of iron of the reduced iron powder (i.e., at the ratio of Cu/Fe=0.01). The vibrating ball mill was charged with 5 mm diameter zirconia balls whose volume was equal to 50 vol % of the internal volume of the mill, the interior of the mill was charged with an atmosphere of nitrogen gas during processing, and the mill was operated at a vibration frequency of 1250 vpm and amplitude of 9 mm to mechanically mix the reduced iron powder and copper sulfate. After the mixing was stopped, the powder inside was removed into the atmosphere.

In carrying out the processing, the rate of charging the total amount of reduced iron powder and copper sulfate into the vibrating ball mill during operation was varied between 3 levels as in the following Tests 1-3. Test 1: mill charging rate, 13.5 Kg/h. Test 2: mill charging rate, 40.0 Kg/h. Test 3: mill charging rate, 400 Kg/h. In each test, the time from the start of charging to the completion of processing was 4 hours. The powders obtained in the tests were measured for average particle diameter, axis ratio (average major axis length/average minor axis length), planar ratio, and κ value. The results are shown in Table 3. For comparison, the measurement results for the mixed powder of reduced iron powder and copper sulfate prior to charging into the vibrating ball mill are also shown in Table 3.

TABLE 3

| | Starting iron powder | Copper content | Mill charging rate | Average particle diameter | Axis ratio | Planar ratio | κ value |
|---|---|---|---|---|---|---|---|
| Test 1 | Reduced iron powder | 1% | 13.5 Kg/h | 127 μm | 1.64 | 8.8 | 1.2 |
| Test 2 | | | 40.0 Kg/h | 88.6 μm | 1.4 | 4.2 | 0.75 |
| Test 3 | | | 400 Kg/h | 102.8 μm | 1.45 | 2.26 | 0.26 |
| Comparison 1 | | | Unprocessed | 103.8 μm | 1.42 | 1.42 | 0.05 |

From the results shown in Table 3, it can be seen that the planar ratio increased with decreasing charging rate and that the κ value increased as the planar ratio increased. Of particular note is that the κ value rose sharply to increase decomposition capability when the planar ratio rose to 2 and higher.

The invention claimed is:

1. A method for producing a decomposer of organic halogenated compounds comprising:
   a) providing an iron powder and a copper sulfate powder;
   b) mechanically mixing the iron powder and the copper sulfate powder in a ball mill and in a dry method to plastically deform iron particles of the iron powder to give them a flat shape, to expose an inner iron matrix of the iron particles, and to join surfaces of the iron particles to surfaces of copper sulfate particles to produce the decomposer of organic halogenated compounds, wherein the iron particles of the decomposer have a flat shape with a planar ratio of 2 or greater.

2. The method for producing a decomposer of an organic halogenated compound according to claim 1, wherein the iron powder is reduced iron powder and the copper sulfate powder has been obtained by dehydration treatment.

* * * * *